United States Patent [19]

Salyer et al.

[11] Patent Number: 4,617,332

[45] Date of Patent: Oct. 14, 1986

[54] PHASE CHANGE COMPOSITIONS

[75] Inventors: Ival O. Salyer, Dayton; Charles W. Griffen, Mason, both of Ohio

[73] Assignee: University of Dayton, Dayton, Ohio

[21] Appl. No.: 646,402

[22] Filed: Aug. 31, 1984

[51] Int. Cl.$^4$ .............................. C08K 3/10; C08K 3/20
[52] U.S. Cl. ............................................. 524/4; 524/5; 524/7; 524/8; 106/85; 106/90; 106/100; 106/111
[58] Field of Search ................... 106/85, 90, 100, 111; 524/8, 4, 5, 7

[56] References Cited

U.S. PATENT DOCUMENTS

| | | | |
|---|---|---|---|
| 3,826,735 | 7/1974 | Shinomura | 524/571 |
| 3,896,065 | 7/1975 | Reardon et al. | 524/446 |
| 4,131,587 | 12/1978 | Brenner | 524/251 |
| 4,147,677 | 4/1979 | Lundberg et al. | 524/444 |
| 4,175,069 | 11/1979 | Brenner | 524/252 |
| 4,207,115 | 6/1980 | Boehme et al. | 106/95 |
| 4,208,310 | 6/1980 | Lundberg et al. | 524/444 |
| 4,259,401 | 3/1981 | Chahroudi et al. | 428/306 |
| 4,404,239 | 9/1983 | Grunewalder | 524/490 |
| 4,415,696 | 11/1983 | Mark | 524/490 |
| 4,504,402 | 3/1985 | Chen et al. | 252/70 |

*Primary Examiner*—Herbert J. Lilling
*Attorney, Agent, or Firm*—Biebel, French & Nauman

[57] ABSTRACT

Compositions containing crystalline, long chain, alkyl hydrocarbons as phase change materials including cementitious compositions containing the alkyl hydrocarbons neat or in pellets or granules formed by incorporating the alkyl hydrocarbons in polymers or rubbers; and polymeric or elastomeric compositions containing alkyl hydrocarbons.

10 Claims, 2 Drawing Figures

PHASE CHANGE COMPOSITIONS

GOVERNMENT RIGHTS

The United States Government has certain rights under the inventions disclosed herein.

BACKGROUND OF THE INVENTION

The present invention relates to compositions embodying phase change materials and, more particularly, to compositions containing crystalline, long chain alxyl hydrocarbons having at least 14 carbon atoms.

There is a great deal of interest in phase change thermal energy storage systems due to their inherent ability to store large amounts of heat and release it to the surrounding environment as temperatures drop below predetermined levels. These systems are of particular interest in the architectural and building trades where climate control and its concomitant energy consumption is one of the principal considerations in building design and material selection.

A variety of building materials and techniques have previously been used to conserve heat or cool and thereby reduce energy costs. Included among them are structural elements which incorporate phase change materials. By incorporating phase change materials into building materials, energy in excess of that necessary to maintain comfort conditions is inherently absorbed and subsequently released when the surrounding environment drops below the comfort range. Thus, in winter months, phase change materials incorporated into structural elements in the walls or floors of buildings and the like can absorb solar energy during daytime hours and release it to the interior at night as temperatures drop. In summer months, the same phase change material, due to its thermostatic character, conserves coolness by absorbing energy.

Structural elements incorporating phase change materials are more desirable than elements which store only sensible heat because they have a higher capacity to store energy and they absorb and release a large quantum of energy over a very narrow temperature range. A phase change material utilizes its latent heat of fusion for thermal storage. The latent heat of fusion is substantially greater than the sensible heat capacity of the material. That is, the amount of energy a material absorbs upon melting, or releases upon freezing, is much greater than the amount of energy it absorbs or releases upon increasing or decreasing in temperature 1° C. Thus, upon melting and freezing, per unit weight, a phase change material absorbs and releases substantially more energy than a sensible heat storage material which is heated or cooled through the same temperature range. Furthermore, as contrasted with a sensible heat storage material which absorbs and releases energy essentially uniformly over a broad temperature range, a phase change material absorbs and releases a large quantum of energy in the vicinity of its melting/freezing point. This is particularly advantageous in buildings where space is at a premium and energy storage and release are required within a very narrow comfort range.

It has long been recognized that an effective phase change material which could store and release thermal energy within the temperature range of 10°-65° C.; and could be economically incorporated into common building materials (e.g., concrete, cement, plaster, rubber, plastics) would have broad utility for many heating and cooling application including solar passive, solar active, off-peak electric load leveling, bridge deck deicing, etc. Other types of phase change materials have been investigated that melt and freeze in the above temperature range, and have a high heat of fusion (e.g., salt hydrates and clathrates); but wide spread use has not been achieved because of tne difficulty of containerizing them, their instability to repeated thermocycling, corrosion, leakage, etc. The paraffin waxes have also been considered for use as phase change materials but until now effective methods of incorporating them into building materials were not available, and/or involved prohibitive loss in the physical properties of the building marerials.

Among the teachings which were available in the art prior to the present invention are those of U.S. Pat. No. 4,259,401 to Chahroudi et al which discloses both structural and non-structural building materials incorporating phase change materials. These building materials are made up of a rigid porous matrix structure which is impregnated with the phase change material. Three classes of phase change materials are disclosed, namely, hydrated salts, waxes, and clathrates. Cements, plasters or thermosetting materials may form the rigid matrix.

SUMMARY OF THE INVENTION

The present invention is broadly directed to compositions which are useful in thermal energy storage and include crystalline, long chain alkyl hydrocarbons having 14 or more carbon atoms, as phase change materials.

In accordance with one embodiment of the present invention, crystalline, alkyl hydrocarbons are incorporated into cementitious compositions. It has been found that alkyl hydrocarbons can be directly incorporated, by dry or wet mixing, into cementitious compositions such as concrete, cement, plaster, at concentrations up to five percent by weight in the case of certain cements and 10 percent by weight in the case of gypsum, without prohibitive loss in the strength properties of the matrix. By choosing the proper alkyl hydrocarbon, the temperature at which termal energy is stored can be varied from −12° C. (tetradecane) to 65° C. (commercial microcrystalline waxes). For bridge deck deicing, hexadecane, which melts at about 10° C., is advantageous. For solar passive octadecane, which melts at about 28° C., is used. For solar active storage commercial paraffin waxes that melt in the range of 50°-65° C. are needed.

In accordance with another embodiment of the invention, the alkyl hydrocarbon is incorporated into polymeric or rubber carriers, with or without crosslinking, and these composites are incorporated as granules or pellets into cementitious products. A special advantage is gained using crystalline rubber carriers that melt in the same or a different temperature range as the alkyl hydrocarbons and exhibit a significant heat of fusion. It has been found that alkyl hydrocarbons can be incorporated into rubbers having low, but significant heats of fusion to obtain a higher total storage capacity. Examples of rubbers of this type that could be used include natural rubber (Mp=−6° and 25° C.), Balata and Gutta percha (Mp 56°-65° C.) and polychloroprene (Mp=32° C.). Thus, one can choose a rubber matrix which has a crystalline melting point in the same range as that of the specific alkyl hydrocarbon selected, or one can select a rubber having a higher or lower melting point to obtain a dual temperature storage system.

In accordance with still another embodiment of the invention, commecial paraffin waxes such as Shell 100 (mp 42° C.), Whitco (Mp 53° C.), Paraffin 150 (Mp 61° C.), can be blended with lower melting $C_{16}$ (Mp 10° C.) and $C_{18}$ (Mp 28° C.) crystalline hydrocarbons to produce phase change materials with intermediate melting temperatures and these can be incorporated into structural materials as described above.

In another embodiment of the invention, the alkyl hydrocarbons are incorporated into cementitious compositions in combination with a polar hydrocarbon which functions similar to a wetting agent by enhancing the affinity of the hydrocarbon for the cement and enabling the hydrocarbon to permeate the cement and waterproof it.

A further emodiment of tne present invention resides in polymeric compositions and, more particularly, elastomeric compositions containing crystalline alkyl hydrocarbons useful in forming moldings, sheets, films, rods, fibers, as well as pellets. These compositions can be designed to be useful in the manufacture of flooring, tiles and wall panels having excellent thermal storage capability.

BRIEF DESCRIPTION OF THE DRAWINGS

The present invention will be explained by reference to the accompanying drawings wherein.

DETAILED DESCRIPTION OF THE PREFERRED EMBODIMENTS

Figure 1:
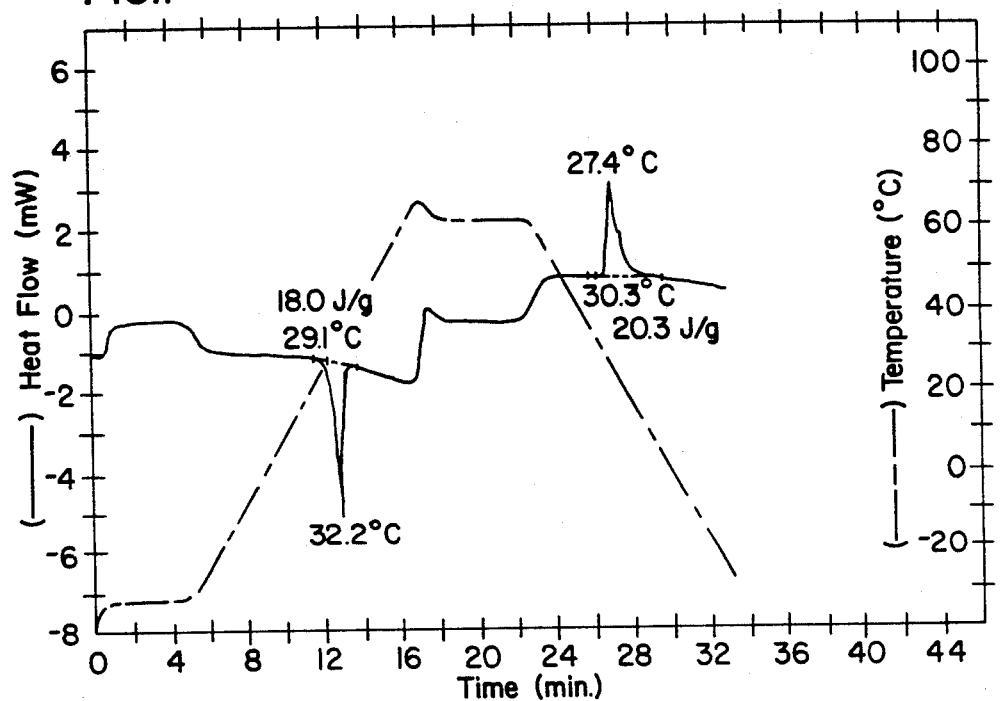
FIG. 1 is a differential scanning calorimetry curve for the cementitious composition of Example 1.

In accordance with the present invention, crystalline alkyl hydrocarbons containing 14 or more carbon atoms are incorporated into matrix materials where they function as phase change materials.

A number of commecially available waxes are useful as phase change materials in the present invention including Shellwax 100 (mp 42°-44° C.), Shellwax 120 (mp 44°-47° C.), Shellwax 200 (mp 52°-55° C.), Shellwax 300 (mp 60°-65° C.), Boron R-152 (mp 65° C.), Union SR-143 (mp about 61° C.), Whitco 128 (mp about 53° C.), Aristowax 143 (mp 34 -61° C.), and Paraffin 150 (mp about 61° C.). These waxes have heats of fusion greater than 30 cal/g and, by comparison to other phase change materials, they are inexpensive—many of them costing as little as 28 U.S. cents per pound when purchased in tank car quantities. Many waxes, as commercially obtained, are not preferred for use in passive energy storage systems as used in climate control because their melting point is too high. Consequently, in accordance with the preferred embodiments of the invention, these materials are combined with crystalline alkyl hydrocarbons having 14-18 carbon atoms and, more specifically, 14, 16, or 18 carbon atoms in order to bring the melting point of the blend within the range of 16° to 42° C.

It has been found that alkyl hydrocarbons are compatible with both cementitious and polymeric materials and, as such, they can be incorporated into these materials and used in the building trade to provide structures having desirable thermal energy storage characteristics.

The cementitious compositions of the present invention include a cementitious material as a rigid matrix-forming material. Typical examples of useful cementitous materials are hydraulic cements, gypsum, plaster of Paris, lime, etc. Portland cement is by far the most widely used hydraulic cement. Portland cements are ordinarily used for construction purposes. Types I, II, III, IV, and V may be used. White cements, air entrained cements, high alumina cements, masonry cements can also be used.

Concretes are mixtures of hydraulic cements and aggregates. Typical aggregates include conventional coarse aggregates such as gravel, granite, limestone, quartz sieve, etc., as well as so-called fine aggregates such as sand and fly ash. Conventional hydraulic cement concretes, e.g., Portland cement concretes, employ major amounts, about 50 to 75% by volume of such aggregates in the set product. These cements and concretes fall within the term "cementitious material" as it used herein.

The cementitious compositions of the present invention also include concrete and plaster compositions useful in the manufacture of pre-formed materials such as concrete blocks, dry wall, and the like as well as in forming poured concrete structures such as used in forming the walls, floors, floor pads and partitions of buildings. In addition, the compositions of the present invention also include compositions useful in road, runway and bridge deck construction where icing can be prevented by incorporation of the phase change material for thermal energy storage during the day, and release during the night to prevent freezing of water on the surface.

When incorporated into cementitious compositions neat, the alkyl hydrocarbons are preferably used in combination with a polar hydrocarbon which functions similar to a wetting agent by enhancing the affinity of the alkyl hydrocarbon for the cement and/or lowering its surface tension. In this case the alkyl hydrocarbon permeates the concrete and, in addition to functioning as a phase change material, also functions in waterproofing the concrete. Representative examples of useful polar hydrocarbons include long chain (i.e., having more than 12 carbon atoms) fatty acids such as stearic acid and polar waxes such as montan wax or hydrogenated tallow. The polar hydrocarbon used is also a phase change material and thus may be used in amounts up to 100 parts per 100 parts of alkyl hydrocarbon and preberably about 1 to 25 parts per 100 parts alkyl hydrocarbon. Heating the concrete (for example at 30°-60°) after curing causes the alkyl hydrocarbon to migrate throughout the concrete, and to the surface whereby it seals the concrete and renders it waterproof.

It has been found that incorporating alkyl hydrocarbons into cement or concrete compositions tends to reduce the strength of the set concrete. The alkyl hydrocarbon is lubricative and reduces the amount of adhesion of the cement to the sand and aggregate that can occur in the concrete matrix. As a result, it is generally not desirable to use more than 5% dry weight alkyl hydrocarbon in a cement composition such as Portland cement or more than 10% dry weight with a gypsum, plaster of Paris, or dry wall composition. There is no lower limit on the amount of alkyl hydrocarbon used in the composition since theoretically any amount will provide some thermal storage benefit. Typically, the compositions of the present invention contain at least 1% of the crystalline alkyl hydrocarbon.

Because the alkyl hydrocarbons detract from the physical properties of set concrete compositions, it is preferred to incorporate the hydrocarbon in the cement compositions in one of the polymeric compositions described below in the form of a pellet or granule ranging from about 0.25 to 3.0 mm in particle size. Pellets or granules can be produced by incorporating the alkyl hydrocarbon in a polymer, and grinding or cutting the polymer. For use in cementitious compositions, the polymeric compositions need not be crosslinked since the form stability of the pellet is not important. In this case, the cementitious composition can include up to 50% by weight of the pellets or granules containing the hydrocarbon phase change material.

The cementitious compositions of the present invention can be designed for use in various passive thermal storage applications by appropriately selecting the melting point of the alkyl hydrocarbons. Alkyl hydrocarbons which melt in the range of about 16° to 42° C. are used in passive solar heating such as in the building materials and structures previously mentioned. For bridge deck or roadway deicing, alkyl hydrocarbons which melt at about 5° to 15° C. are preferably used.

In accordance with the present invention, alkyl hydrocarbons can also be incorporated into thermosetting or thermoplastic, elastomeric or non-elastomeric polymeric materials. Included within the scope of the term "polymeric materials" are natural and synthetic rubbers. The polymeric material must be compatible with the alkyl hydrocarbons such that the alkyl hydrocarbon can be incorporated into the polymeric material and remain dispersed therein upon molding or coating. If the materials are not sufficiently compatible, the alkyl hydrocarbon will be more difficult to disperse in the polymer and will be present as a separate phase of dispersed droplets.

Crystalline long chain hydrocarbons can be most readily dispersed in less polar or non-polar rubbers or polymers such as natural rubber, butyl rubber, polybutadiene, copoly(butadiene/styrene) and copoly(ethylene/propylene) (EPDM). They can also be dispersed in polar polymers such as nylons, polyesters, acrylate rubbers, methacrylate rubbers, polyvinyl alcohol, ethylene vinylacetate copolymers, polyvinyl acetate, vinyl chloride/vinyl acetate copolymer, neoprene, butadiene-acrylonitrile rubber, etc.

Whether the alkyl hydrocarbon is dissolved or dispersed does not appear to have a significant effect on the melting and crystallization of the phase change material. The alkyl hydrocarbon can be dissolved and/or dispersed in the polymer depending upon the nature of the polymer and the concentration of the alkyl hydrocarbon that is used.

The polymeric compositions of the present invention can be used in a crosslinked or uncrosslinked form depending on end use and the need for thermal form stability. Crosslinking does not necessarily interfere with the phase change properties of the crystalline alkyl hydrocarbon. However, it is essential that the polymer compositions not be crosslinked to an extent that the phase change material loses its ability to melt and freeze effectively and results in reduced heat of fusion.

It is particularly advantageous to incorporate the alkyl hydrocarbon into rubbers and other elastomers having significant crystallinity that they can also function as phase change materials. Natural rubber reportedly has phase transitions at −6° and 25° C. Neoprene reportedly has a crystalline melting point at about 32° C., as is desirable for comfort heating. Other semi-crystalline rubbers include some EPDM and copoly(ethylene/vinyl acetate) rubbers. Hence, a crystalline matrix rubber containing an alkyl hydrocarbon can provide augmented thermal energy storage capacity since both parts of the composite contribute.

The alkyl hydrocabon can be incorporated into the aforesaid polymeric compositions in amounts of up to 50% by weight, depending on the nature of the hydrocarbon and the polymer used. Theoretically, there is no lower limit on the amount of phase change that is used since some thermal energy storage benefit (although small) accompanies any addition. Usually, the phase change material is used in an amount of at least 1% by weight.

In forming molded products, the alkyl hydrocarbon can be mixed with the polymeric material in a conventional manner, e.g., in a banbury or on a roll mill. Furthermore, conventional plasticizers, fillers, pigments, curing agents, accelerators, etc., can be added to the compositions to adjust their physical properties as desired. It is advantageous to add fillers such as finely divided silica and carbon black to the polymer composition. They may be added in amounts ranging from about 10 to 100 parts per 100 parts of polymer.

The polymeric compositions of the present invention can be compounded in an otherwise conventional manner to provide compositions useful in forming rubber floor tiles, flooring and the like.

In accordance with still another embodiment of the invention, pellets formed in accordance with the present invention are used in active or passive hybrid thermal storage systems such as a pellet bed heat exchanger in which a heat exchange fluid such as air, ethylene glycol, water or the like is circulated through a pellet bed. In this use the pellets (the carrier polymer) are preferably crosinked and the alkyl hydrocarbon has a melting point in the range of 10° to 65° C.

The present invention is illustrated in more detail by reference to the following examples.

EXAMPLE 1

A cementitious phase change composition was prepared by adding octadecane to an aqueous slurry of gypsum in an amount of 10 parts octadecane per 90 parts gypsum. The composition was allowed to harden and submitted to differential scanning calorimetry (DSC) analysis. The temperature flux was 10° C. per minute. The DSC curve is shown in FIG. 1. The figure clearly shows the melting (32.2° C.) and crystallization (27.4° C.) of octadecane. Thus, the C-18 alkyl hydrocarbon retains its advantageous latent heat storage characteristics in gypsum.

EXAMPLE 2

Figure 2:
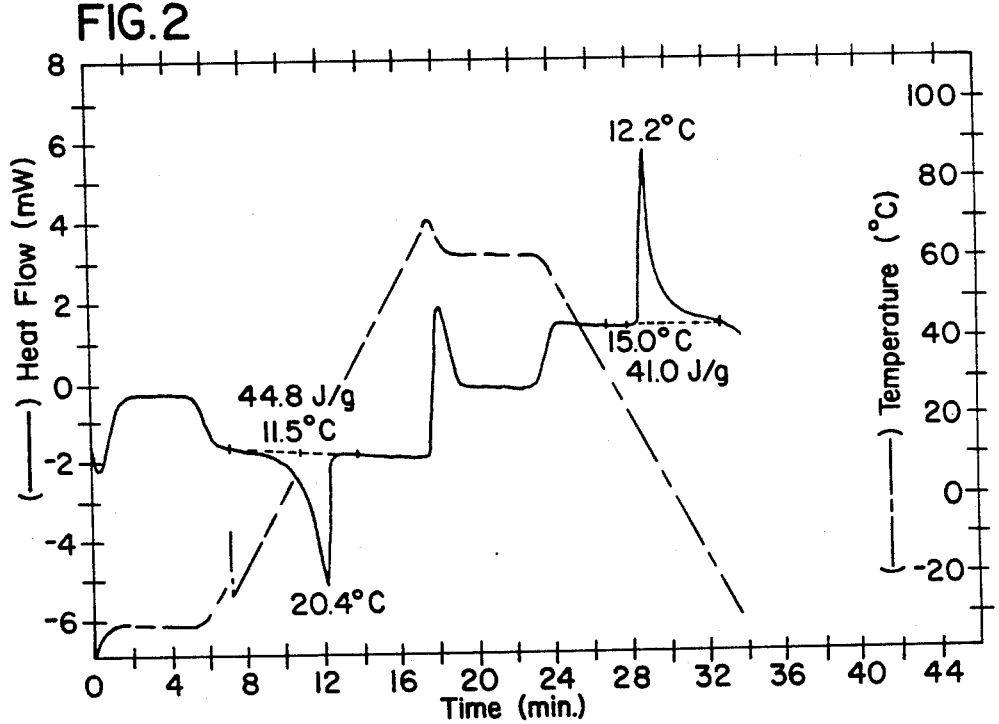
FIG. 2 is a differential scanning calorimetry curve for the polymeric composition of Example 2.

A rubber composition useful in forming pellets for passive thermal storage was prepared by compounding 100 parts natural rubber, 100 parts octadecane, 1 part stearic acid, 40 parts Cabosil, 2.0 parts Santecure NS, 5.0 parts zinc oxide, 2.5 parts Flexzone, and 2.5 parts sulfur. The composition was cured at 350° F. for 30 minutes and submitted to DSC analysis. The curve is shown in FIG. 2. Melting and crystallization of the octadecane occurred at 25.8° C. and 18.2° C., respectively. The heat of fusion of the octadecane was thus retained.

EXAMPLE 3

The following rubber (EPDM) compositions were prepared and cured at 350° F. for 30 minutes. The alkyl hydrocarbons employed in each of the compositions retained their melting point and heat of fusion characteristics.

| | Parts by Weight | | | | | |
|---|---|---|---|---|---|---|
| | 1 | 3 | 7 | 5 | 9 | 11 |
| EPDM | 100 | 100 | 100 | 100 | 100 | 100 |
| Shell X-100 Paraffin Wax (Shell Oil Co.) | 66 | 66 | 50 | 33 | 33 | 33 |
| Silica Filler | 50 | — | 50 | 50 | — | — |
| Carbon Black Filler | — | 50 | — | — | 50 | 50 |
| Stearic Acid | 5 | 5 | 5 | 5 | 5 | 5 |
| DiCup R (Hercules Chemical Co., vulcanizing agent) | 3 | 3 | 3 | 3 | 3 | 3 |
| Octadecane | — | — | 16 | 33 | — | — |
| Octadecane (technical grade) | — | — | — | — | 33 | — |
| Hexadecane | — | — | — | — | — | 33 |

Having described the invention in detail and by reference to specific embodiments thereof, it will be apparent that numerous modifications and variations are possible without departing from the scope of the following claims.

What is claimed is:

1. A composition useful in thermal energy storage comprising a cementitious matrix material selected from the group consisting of hydraulic cement, gypsum, lime, and plaster of paris; and plurality of pellets or granules containing a crystalline straight chain alkyl hydrocarbon or a mixture of crystalline, straight chain, alkyl hydrocarbons, said hydrocarbon(s) having at least 14 carbon atoms and a heat of fusion greater than 30 cal/g., and said pellet or granule being formed by a process consisting essentially of dissolving or dispersing said alkyl hydrocarbon(s) in a polymer and grinding or cutting said polymer, said polymer being sufficiently compatible with said alkyl hydrocarbon such that said alkyl hydrocarbon can be dissolved or dispersed in said polymer.

2. The composition of claim 1, wherein said polymer is selected from the group consisting of natural rubber, butyl rubber, polybutadiene, co-poly(butadiene/styrene), co-poly(ethylene/propylene), nylons, polyesters, acrylate rubbers, methacrylate rubbers, polyvinyl alcohol, ethylene vinyl acetate co-polymers, polyvinyl acetate, vinyl chloride/vinyl acetate co-polymer, neoprene, and butadiene-acrylonitrile rubber.

3. The composition of claim 1, wherein said polymer is natural or synthetic rubber.

4. The composition of claim 3, wherein said alkyl hydrocarbon(s) has 16 to 18 carbon atoms.

5. The composition of claim 3, wherein said alkyl hydrocarbon(s) has a melting point in the range of about 16° to 42° C.

6. The composition of claim 3, wherein said alkyl hydrocarbon(s) has a melting point in the range of 5° to 15° C.

7. The composition of claim 3, wherein said alkyl hydrocarbon(s) has a melting point in the range of 42° to 65° C.

8. The composition of claim 1, wherein said pellet or granule contains up to 50% by weight of said hydrocarbon.

9. The composition of claim 1, wherein said pellets or granules have a particle size of approximately 0.25 to 3.0 mm.

10. The composition of claim 2 wherein said rubber is selected from the group consisting of natural rubber, butyl rubber, E&DM, polybutadiene, and copoly(butadiene/styrene).

* * * * *

UNITED STATES PATENT AND TRADEMARK OFFICE
CERTIFICATE OF CORRECTION

PATENT NO. : 4,617,332

DATED : October 14, 1986

INVENTOR(S) : Ival O. Salyer and Charles W. Gritfen

It is certified that error appears in the above-identified patent and that said Letters Patent is hereby corrected as shown below:

Column 8, line 34 (Claim 10) "E&DM" should be --EPDM--.

Signed and Sealed this

Seventh Day of July, 1987

Attest:

DONALD J. QUIGG

Attesting Officer

Commissioner of Patents and Trademarks